A. G. UPTEGRAFF.
NON-SLIP TREAD.
APPLICATION FILED AUG. 3, 1909.
1,068,714.
Patented July 29, 1913.
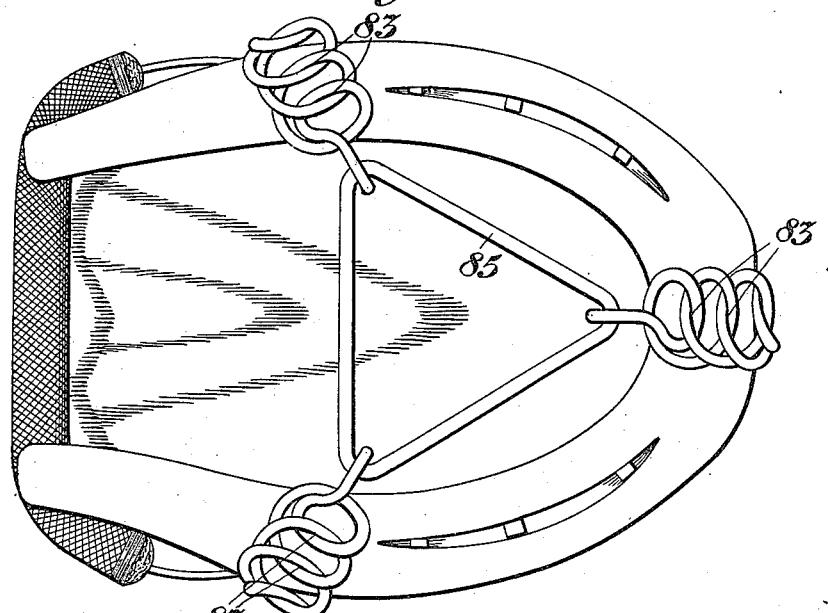
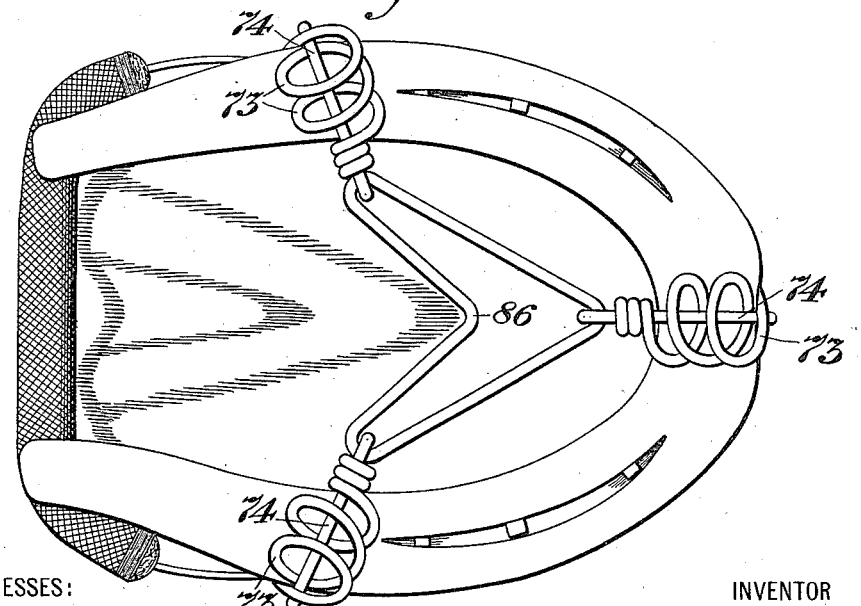

UNITED STATES PATENT OFFICE.

ALEXANDER G. UPTEGRAFF, OF LENOX, MASSACHUSETTS.

NON-SLIP TREAD.

1,068,714.  Specification of Letters Patent.  Patented July 29, 1913.

Original application filed March 12, 1909, Serial No. 482,898. Divided and this application filed August 3, 1909. Serial No. 511,073.

*To all whom it may concern:*

Be it known that I, ALEXANDER G. UPTEGRAFF, a citizen of the United States, and a resident of Lenox, in the county of Berkshire and State of Massachusetts, have invented certain new and useful Improvements in Non-Slip Treads, of which the following is a specification.

My present invention concerns tread members adapted to be applied beneath the foot to prevent slipping. They are adapted for use in connection with any foot provided with a relatively firm or solid portion adapted to engage the ground, whether artificially provided, as in the case of the ordinary boot or shoe on the human foot, or naturally provided, as in the case of hoofed animals, with or without the ordinary protecting shoe, of which the horseshoe is a well-known type.

The tread members herein shown constitute part of my prior Patent No. 1,046,509, of which this application is a division. The tread disclosed herein is of the flexible or yielding type, and is particularly adapted for use in connection with any securing means encircling or engaging the foot or hoof, particularly the securing means set forth in the patents of George N. Kinnell, Patent Nos. 1,010,380 and 1,010,386, or the various modifications thereof shown in my said prior Patent No. 1,046,509. The invention set forth and claimed herein is a yielding tread, wherein the structure is sufficiently rigid to serve satisfactorily the function of calks to prevent slipping, supported in a sufficiently movable, flexible, or yielding manner, and yet not composed of links or articulations after the manner of the flexible tread set forth in said Patent No. 1,010,380.

The members or strands comprising my tread have the flexibility and tensile strength necessary for such devices when used as tension members exposed to violent stresses, as in the case of an overshoe for horses, by reason of the use of fine quality steel wire, as, for instance, piano wire. As set forth in my prior patent Patent No. 1,046,509, such wire may be used as a plurality of parallel lengths without any protection; or solid bodies, such as rings or beads of various shapes, may be strung thereon; or much heavier, stiffer wire may be used, the metal being bent upon itself after the manner of a spring, so as to afford sufficient elasticity to permit of a desired flexibility of the strand notwithstanding the relatively great stiffness of the material from which it is constructed.

My present application concerns the latter invention, and I will now proceed to describe my specific embodiment thereof, in connection with the accompanying drawings, in which—

Figures 1 and 2 are bottom plan views of a hoof having an ordinary horse shoe applied thereto and showing a non-slip tread composed of coiled tread strands associated with a central link.

In said figures, I have shown strand members consisting of spring steel, heavy and rigid enough to serve as satisfactory calks, the material being coiled or bent upon itself so that the adjacent portions thereof are held in operative relation in a sufficiently movable, flexible or yielding manner.

I may use metal which would be too stiff, if used in a short straight length, but when arranged in flat coils, constitutes a satisfactory flexible tread member adapted to yield sufficiently to prevent localized breaking stresses or direct transmission of stresses to the securing means on the sides of the hoof.

In Fig. 2, the strands consist of a flattened helical spring 73, which, if desired, may be stayed against stretching by coiling it about a longitudinally extending axial portion 74. In the latter case, the portion 74 may be a simple length of piano wire of small diameter, or both portions of the strand 73, 74 may be formed from a single length of material bent in the form shown. It will be noted that this form of strand might be formed by taking an old fashioned helical door spring, drawing the temper, flattening it, and retempering.

In Fig. 1, the coils of material forming a tread strand are interlinked, as at 83, so as to form a plurality of thicknesses of material crossing each other at an angle, and thus affording good calk surfaces, while at the same time the construction is stayed against longitudinal stretching and lateral distortion by the direct interlinkage of adjacent coils.

In Figs. 1 and 2, the strands are shown as comprising two similar side strands and a toe strand, though it will be obvious that four or five strands may be used. Where three strands are used, a triangular link 85 may be used, as shown in Fig. 1, or the base of the triangle may be carried toward the point of the frog, as indicated at 86, Fig. 2.

While I have herein fully shown and described, and have pointed out in the appended claims certain novel features of construction, arrangement, and operation which characterize my invention, it will be understood by those skilled in the art that various omissions, substitutions, and changes in the forms, proportions, sizes, and details of the device and of its operation, may be made without departing from my invention.

I claim:

1. A non-slip appliance for horses' hoofs comprising spring members extending transversely across the tread of the hoof, a link to which the members are secured, and means for securing the members and the link in place on a hoof.

2. A non-slip appliance for horses' hoofs consisting of tread members comprising heavy spring wire disposed in intertwined flattened coils and extending transversely across the tread of the horseshoe, a link to which said members are secured, located below the hoof and within the arch of the shoe, and means for securing the members in place on a hoof.

3. A non-slip appliance for horses' hoofs comprising spring members extending across the tread of the horseshoe and extensible transversely thereof, a link, to which one end of each member is secured, located below the hoof and within the arch of the shoe and means secured to the other ends of the members for securing the appliance in place.

4. A non-slip appliance for horses' hoofs comprising a plurality of spring members extending transversely across the tread of the hoof, linking means securing said plurality together and means for securing the assemblage in place on a hoof.

5. A non-slip appliance for horses' hoofs comprising a plurality of short tread members consisting of heavy spring metal disposed in intertwined flattened coils and a linking member spanning the arch of the shoe and securing said spring metal members together.

6. A non-slip appliance for horses' hoofs comprising a plurality of short tread members consisting of spring metal disposed in interengaging loops and a linking member spanning the arch of the shoe and securing said spring metal members together.

7. A non-slip appliance for horses' hoofs comprising a plurality of short tread members consisting of spring metal disposed in superposed lengths crossing each other at an angle and a linking member spanning the arch of the shoe and securing said spring metal members together.

8. A non-slip appliance for horses' hoofs comprising a plurality of short tread members consisting of spring metal in the form of interlooped crossing wires and a linking member spanning the arch of the shoe and securing said spring metal members together.

9. A non-slip appliance for horses' hoofs comprising a plurality of short tread members consisting of spring metal in the form of wire flexed and arranged with portions crossing at an angle and a linking member spanning the arch of the shoe and securing said spring metal members together.

Signed at Lenox, in the county of Berkshire and State of Massachusetts, this thirtieth day of July, A. D. 1909.

ALEXANDER G. UPTEGRAFF.

Witnesses:
GEO. WESTINGHOUSE, Jr.,
JAMES H. SHALLEY.

---

Copies of this patent may be obtained for five cents each, by addressing the "Commissioner of Patents, Washington, D. C."